(12) United States Patent
Subraveti et al.

(10) Patent No.: US 11,722,171 B2
(45) Date of Patent: Aug. 8, 2023

(54) DEVICE RANGING USING UWB (71) Applicant: NXP B.V., Eindhoven (NL)

(72) Inventors: Diwakar Subraveti, Bangalore (IN);
Abdul Wahid Abdul Kareem, Irvine, CA (US); Shengyang Xu, Irvine, CA (US); Atmaram Kota Rajaram, Bengaluru (IN); Ajay A Jampale, Bengaluru (IN)

(73) Assignee: NXP B.V., Eindhoven (NL)

( * ) Notice: Subject to any disclaimer, the term of this patent is extended or adjusted under 35 U.S.C. 154(b) by 1 day.

(21) Appl. No.: 17/455,437

(22) Filed: Nov. 18, 2021

(65) Prior Publication Data

US 2022/0200656 A1 Jun. 23, 2022

(30) Foreign Application Priority Data

Dec. 18, 2020 (IN) .............................. 202011055234

(51) Int. Cl.
*H04B 1/7176* (2011.01)
*H04B 1/7183* (2011.01)

(52) U.S. Cl.
CPC ......... *H04B 1/7176* (2013.01); *H04B 1/7183* (2013.01)

(58) Field of Classification Search
CPC ............... H04B 1/7176; H04B 1/7183; H04B 2201/71634; G01S 7/42; G01S 13/0209; G01S 13/765
See application file for complete search history.

(56) References Cited

U.S. PATENT DOCUMENTS 9,413,418 B2    8/2016  Bottazzi et al.
2020/0229068 A1*  7/2020  Li ........................ H04L 1/1614
(Continued)

FOREIGN PATENT DOCUMENTS

EP    3158654 B1    8/2018
WO    2019/110833 A1    6/2019

OTHER PUBLICATIONS

Niewczas, Jarek et al.; "Simultaneous Ranging" Project: IEEE P802.15 Working Group for Wireless Personal Area Networks (WPANs); Jul. 11, 2018.
(Continued)

*Primary Examiner* — Sam K Ahn
*Assistant Examiner* — Amneet Singh (57) ABSTRACT

UWB ranging methods and apparatus are disclosed. The method comprises a ranging communication with a plurality of responder devices, the ranging communication comprising: transmitting, by an initiator device, a polling signal in a time slot; receiving a respective response from each of the plurality of responder devices, overlapping and in a next time slot, each response comprising: synchronization bits, and a frame comprising Start of Frame Delimiter, and a Scrambled Timestamp Sequence; wherein the STS comprises a sequence of segments each preceded by a respective guard interval, wherein a specific one of the segments comprises data derived from a ranging key and a responder-identifier each unique to the respective responder among the plurality of responders, wherein a sequence-number of the specific segment is unique to the respective response, and wherein a remainder of the segments each comprise the same data derived from a predetermined common key and predetermined common data.

19 Claims, 5 Drawing Sheets

(56) References Cited

U.S. PATENT DOCUMENTS

2020/0382158 A1* 12/2020 Yang .................. H04B 1/71635
2021/0076350 A1* 3/2021 Yang ........................ G01S 3/50

OTHER PUBLICATIONS

P802.15.4z™/D08; Draft Standard for Low-Rate Wireless Networks; Amendment: Enhanced Ultra Wideband (UWB) Physical Layers (PHYs) and Associated Ranging Techniques; Mar. 2020.

* cited by examiner

DEVICE RANGING USING UWB

CROSS-REFERENCE TO RELATED APPLICATIONS

This application claims priority under 35 U.S.C. § 119 to Indian Provisional Patent Application No. 202011055234, filed on Dec. 18, 2020, the contents of which are incorporated by reference herein.

FIELD

The present disclosure relates to ranging, that is to say distance determination, between an initiator and a plurality of responders using Ultra Wide Band (UWB) protocols.

BACKGROUND

Ranging, and in particular authenticated or secure ranging between an initiator and a plurality of responders, using UWB protocols, is known according to the IEEE 802.15.4z standard. In known ranging methods, an initiator communicates with the plurality of responders to determine the distance between the initiator and each of the responders. Such ranging is useful in an increasing number of applications. A nonlimiting example is that of secure access to a car or other vehicle. In this example, it may be desirable to determine the distance between a key fob or other access device such as a mobile phone, and each of a plurality of anchor points on the vehicle. The access device is the initiator and the anchor points are the responders. Once the distances from the anchor points are known, suitable action can be taken—for example unlocking only the driver's side front door, or the trunk or boot of the vehicle.

In known ranging methods according to the UWB protocols, the initiator broadcasts a polling message, which is received by each of the responders. By means of prior communication—which might have been either using UWB protocols or a different communication modality (such as Bluetooth Low Energy—BLE), the identity of each of the responder is known, and a sequence in which they will respond is also predetermined. The responders send a secure response, one by one, each of which is decoded by the initiator in order to determine the distance between the initiator and each responder. However, such methods occupy several time slots, so are relatively inefficient time-wise. They also require a significant amount of processor resource in the initiator.

SUMMARY

According to a first aspect of the present disclosure there is provided an Ultra Wide Band (UWB) ranging method comprising a ranging communication with a plurality of responder devices. The ranging communication comprises transmitting, by an initiator device, a polling signal in a time slot, and receiving a respective response from each of the plurality of responder devices, overlapping and in a next time slot. Each response comprises: a preamble comprising synchronization bits, a start of frame delimiter (SFD), and a scrambled time-stamp sequence (STS). The STS comprises a sequence of segments each preceded by a respective guard interval, wherein a specific one of the segments comprises data derived from a ranging key and a responder-identifier— the data, ranging key and responder-identifier each being unique to the respective responder among the plurality of responders—wherein a sequence-number of the specific segment is unique to the respective response, and wherein a remainder of the segments each comprise the same data derived from a predetermined common key and predetermined common data. By associating each of the responders with a specific one of the STS segments, it may be possible to improve or one or both of the efficiency of the initiator device which may result in a power saving and the time for the ranging activity which may improve throughput. In one or more embodiments, the ranging communication complies with the Ultra Wide Band, UWB, communication protocol for authenticated secure ranging. Compliance with protocols may ensure compatibility and/or interoperability with other devices.

In one or more embodiments the method further comprises, prior to transmitting the polling signal, transmitting to each responder the respective ranging key and sequence-number, and at least one of the common key and the common data.

This may be by means of a communication protocol which is different from UWB. Use of this out of band communication for this communication may reduce the load on the UWB transceivers, although at the expense of requiring that the transceiver can communicate via a further communication modality such as WIFI or BLE.

In one or more embodiments the method further comprises using the respective synchronisation bits in a correlator to identify each response, and, for each response, fully decoding only the specific one of the segments corresponding to its sequence-number. This may provide a power saving for the initiator.

According to a second aspect of the present disclosure, there is provided a method of operating a responder device among a plurality of responder devices to facilitate UWB ranging and comprising a ranging communication with an initiator device. The ranging communication comprises receiving, by the responder device, a polling signal in a time slot, and transmitting a response in a next time slot. The response comprises a preamble having synchronization bits, a start of frame delimiter (SFD), and a scrambled time-stamp sequence (STS). The STS comprises a sequence of segments each preceded by a respective guard interval. A specific one of the segments comprises data derived from a ranging key and responder-identifier unique to the responder among the plurality of responders; a sequence-number of the specific segment is unique to the response, and a remainder of the segments each comprise the same data derived from a predetermined common key and predetermined common data. In one or more embodiments the ranging communication complies with the Ultrawide Band, UWB, communication protocol for authenticated ranging. In one or more embodiments the method further comprises, prior to transmitting the polling signal, receiving at least one of the common key and the common data, the ranging key and the sequence-number. In one or more embodiments the common key and/or the common data, the respective ranging key and sequence-number is received by means of a communication protocol different to UWB.

According to a further aspect of the present disclosure, there is provided an initiator device configured to perform ranging with a plurality of responder devices. The initiator comprises a transmitter configured to transmit a polling signal in a time slot, and a receiver configured to receive a respective response from each of the plurality of responder devices, overlapping and in a next time slot. Each response comprises: a preamble comprising synchronization bits, a start of frame delimiter (SFD), and a scrambled time-stamp sequence (STS). The STS comprises a sequence of segments each preceded by a respective guard interval, wherein a specific one of the segments comprises data derived from a ranging key and responder-identifier unique to the respective responder among the plurality of responders. A sequence-number of the specific segment is unique to the respective response, and wherein a remainder of the segments each comprise the same data derived from a predetermined common key and predetermined common data.

The initiator may further comprise a correlator, configured to use the respective synchronisation bits in a correlator to identify each response. The initiator may further comprise a decoder, configured to, for each response, fully decode only the specific one of the segments corresponding to its sequence-number.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in modified and different embodiments

DETAILED DESCRIPTION OF EMBODIMENTS

Figure 1:
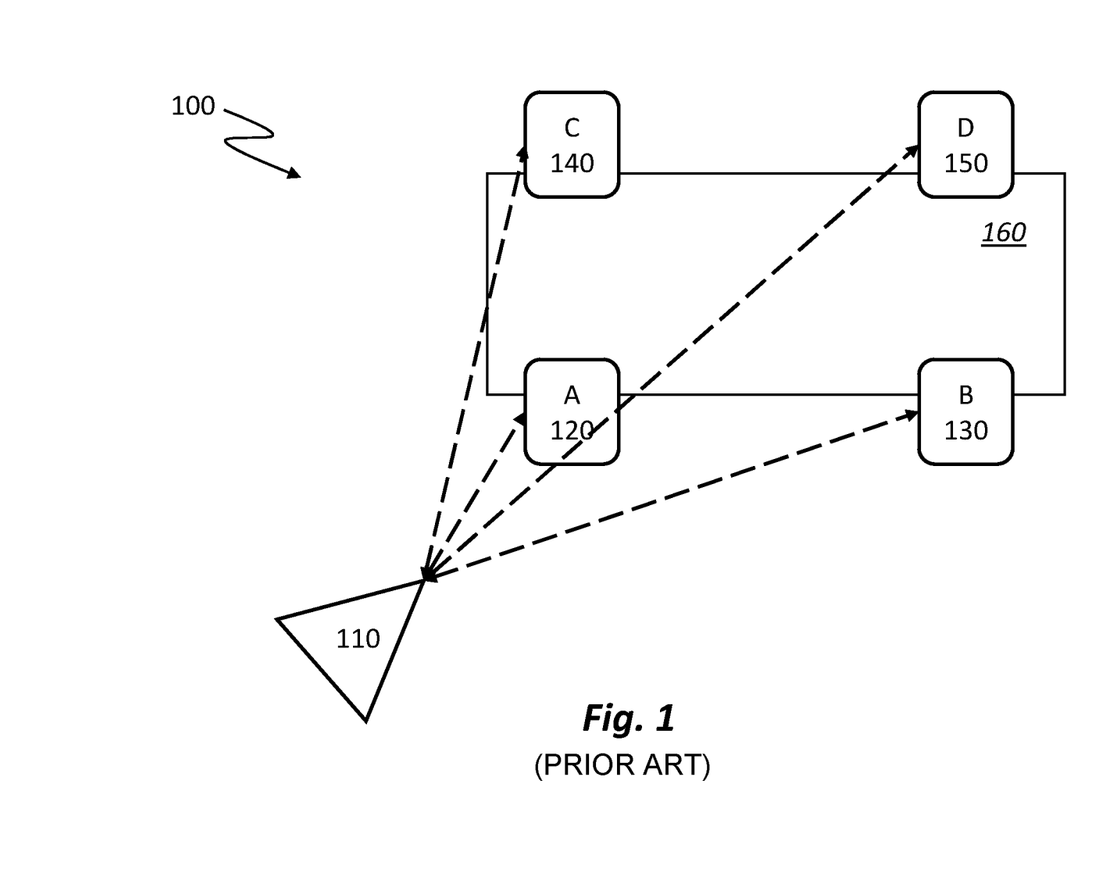
FIG. 1 shows a schematic of a system in which secure ranging by UWB may be used.

FIG. 1 illustrates an example system 100 in which secure ranging by UWB with multiple responders may be used. This system 100 includes a first transceiver device 110, also referred to as the initiator device. This device may be for instance a key fob, or a mobile communication device such as a smart phone. The system 100 also includes a plurality of—in this case four—anchor points, at each of which a further transceiver device, 120, 130, 140, 150, is located. These devices are referred to as responder devices. In this nonlimiting example, the anchor points are at predefined positions around a vehicle 160.

IEEE standard number IEEE 802.15.4z includes protocols defining how UWB communication may be used to achieve secure ranging between an initiator such as device 110 and a plurality of responders such as devices 120, 130, 140, 150. Such a method is shown schematically in FIG. 2. According to the IEEE standard, the initiator sends a poll signal 215 in a first time slot 210. The length of a time slot is defined in the standard, and may be approximately 1 ms. In other examples, a time slot may be approximately 2 ms. Over subsequent time slots, each responder, in turn, transmits a response back to the initiator, one in each time slot. In this non-limiting example there are four responders, each of which responds in a separate time slot 220, 230, 240, and 250.

Figure 2:
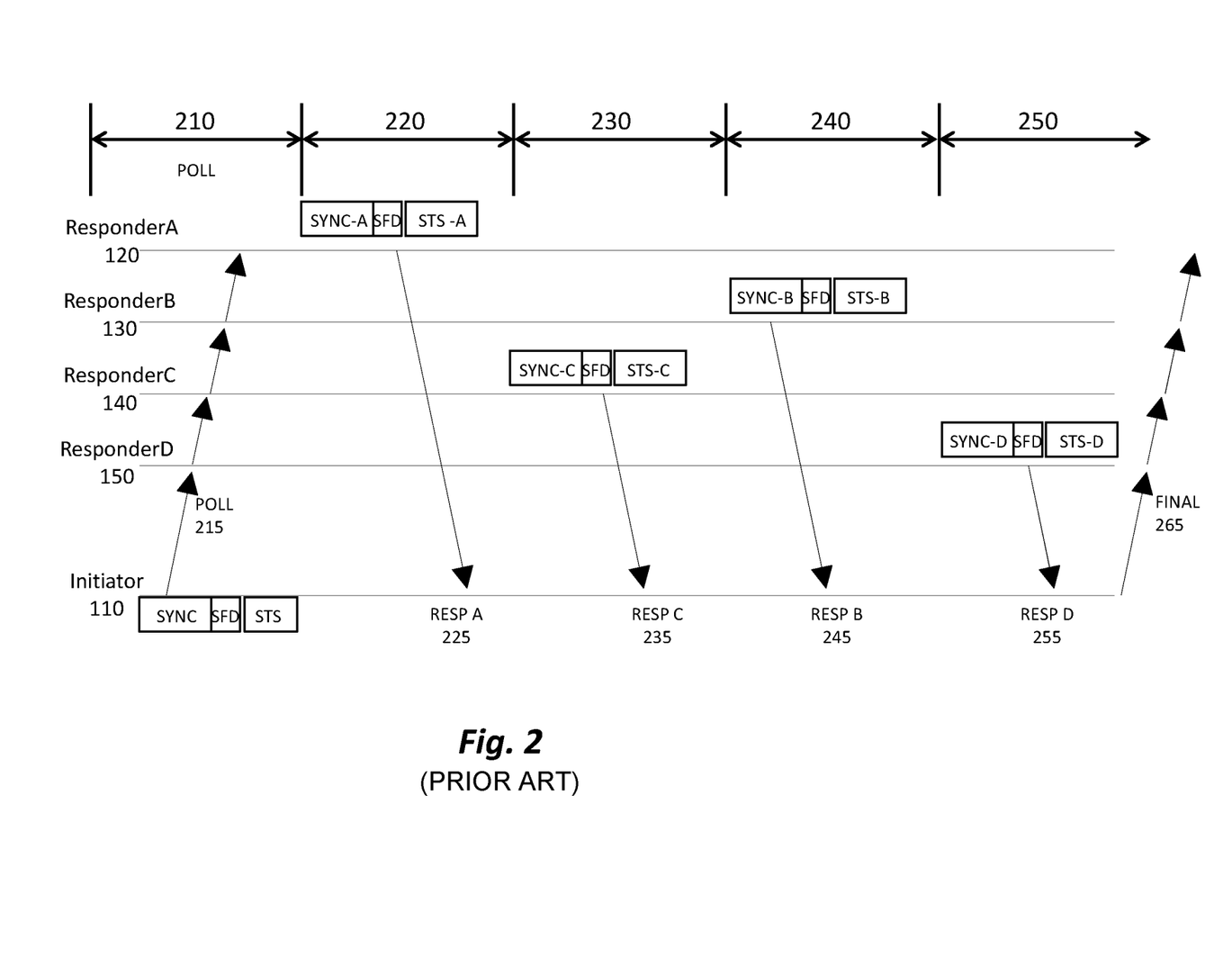
FIG. 2 illustrates, schematically, a conventional secure ranging method using UWB between an initiator and a plurality of responders using multiple time slots.

Again as defined in the standard, the response sequence is predetermined by prior communication between the initiator and the responders. This prior communication may use UWB, or may use a so-called "out of band" (OOB) communication method and protocol such as, without limitation, Bluetooth Low Energy (BLE) or WIFI. A "ranging round" may be defined as the poll transmitted by the initiator, and the group of responses transmitted by the responders. The duration of a ranging round thus increases as the number of responders increases—in this case of four responders a ranging round lasts 5 time slots, that is to say, typically lasts approximately 5 ms, for the common case where each time-slot lasts approximately 1 ms.

The polling message typically consists of synchronisation bits (SYNC), followed by start-of-frame data of start-of-frame delimiter (SFD), which may also be referred to as start-of-frame-delimiter, followed by a single scrambled timestamp sequence (STS) segment, which is generated based on agreed common key. Again, and as will be discussed in more detail hereinbelow, the common key is shared by the initiator and responders by prior communication which may be OOB communication, or may be derived separately by the initiator and responders.

Each response has a similar structure, and comprises a preamble having a training sequence of synchronisation bits (SYNC), followed by start-of-frame data or delimiter (SFD), followed by a scrambled timestamp sequence (STS). The scrambled timestamp sequence is separated from the start of frame delimiter by a guard period which may typically correspond to 1 k bits, or approximately 1 μs. Since the initiator has to be able to receive a response in each of the—in this case four—time slots subsequent to sending its poll message, its power consumption is relatively high. The IEEE 802.15.4z standard provides that the STS may be split into four separate segments, each separated by a guard interval. There then may follow a further—optional—transmission (shown in FIG. 2 as the "final" transmission 265) from the initiator to the responder.

Figure 3:
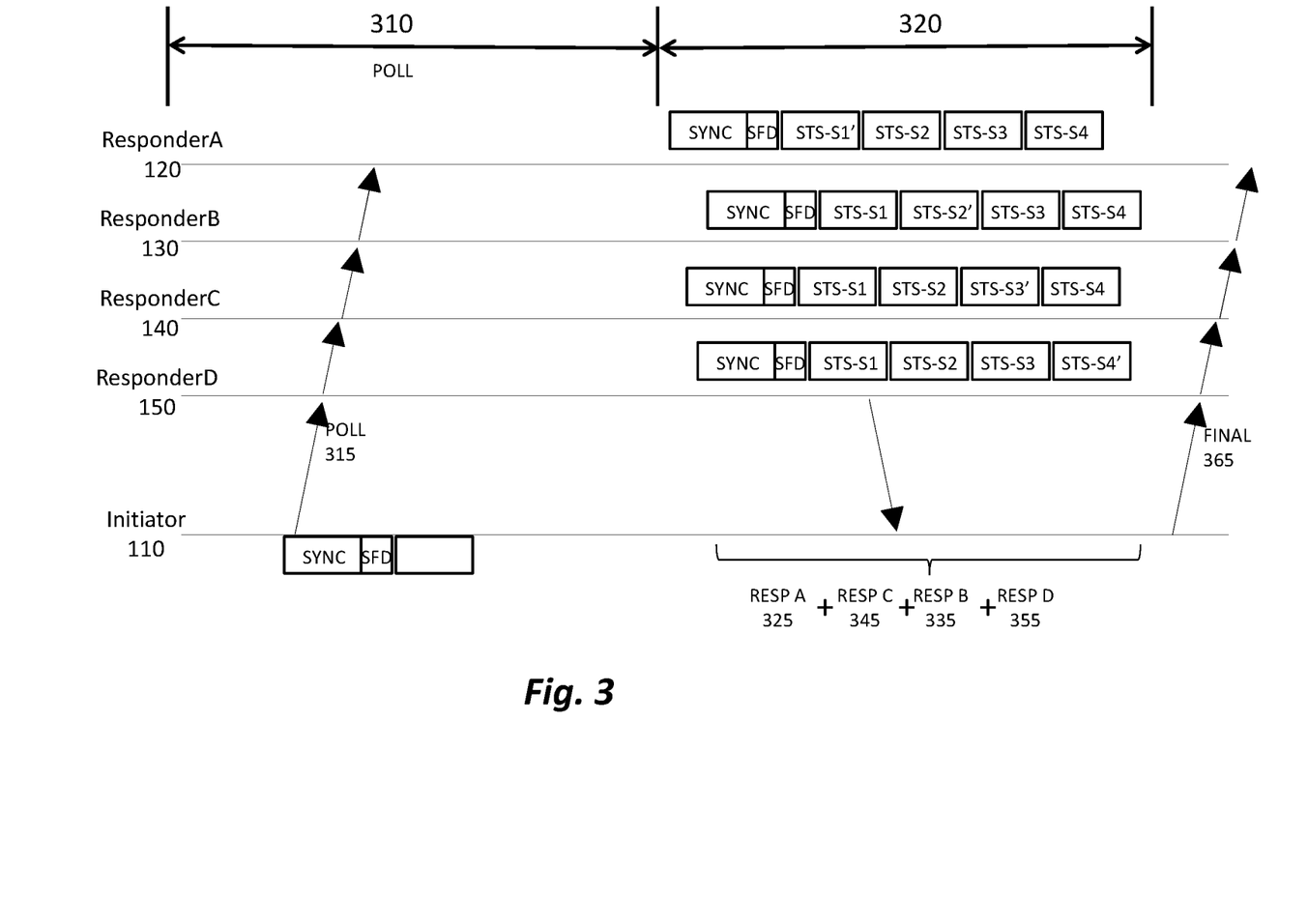
FIG. 3 illustrates, schematically, a secure ranging method using UWB, between an initiator and a plurality of responders, according to one or more embodiments.

According to the present disclosure, a method is provided which may be more power efficient for the initiator and requires only two time slots for a ranging round, excluding any "Final" transmission from the initiator, which as the skilled person will appreciate is relevant or required for double-sided two-way ranging (DS TWR), but is neither relevant nor required for single-sided two-way ranging (SS TWR). This (for DS TWR) is illustrated in FIG. 3. As shown, according to this method the ranging round, of poll and responses, requires only two timeslots irrespective of the number of responders, up to a maximum of 4, in contrast to conventional methods in which the number of time slots is dependent on the number of responders: "number of responders +1" of timeslots. In order to achieve this, the method uses the possibility, provided for in the IEEE 82.15.4z standard, of separating the STS into four separate segments, STS-S1, STS-S2, STS-S3 and STS-S4, and provides responder-specific data in respective different ones of the segments, in which the response transmissions overlap into a single time slot.

The initiator transceiver and each of the responder transceivers can both receive and transmit ultra wideband (UWB), also known as impulse radio, signals. They may also be able to communicate by another, "out-of-band" modality, such as Bluetooth Low Energy.

The present inventors have appreciated that it is possible for the responder to provide sufficient information to the initiator to perform the ranging, in just one of the four segments in the segmented STS. Each responder is allocated a specific STS segment in order to provide its ranging information. The remaining STS segments may be provided with blanking or low content information. It will be appreciated that by focusing the ranging information into just one of the STS segments, the initiator only has to fully decode that segment, and may effectively discard the remaining STS segments received from that responder. This may reduce the processing load on the initiator significantly—typically up to a factor of four—relative to known ranging methods.

Shown in FIG. 3, in a first time slot 310, the initiator 110 transmits a polling message to the group of responders 120, 130, 140 and 150. During the immediately subsequent time slot, all of the responders transmit their own response simultaneously. As shown, the response from each responder includes synchronisation bits (SYNC) followed by a frame. The frame comprises a start of frame delimiter (SFD), and STS comprising four segments, STS-S1, STS-S2, STS-S3 and STS-S4. Each segment is, according to the IEEE standard specification, preceded by a guard interval.

This structure of the frame is the same for each of the—in this case four—responders. However, for each responder, the content of one of the STS segments is unique and specific to that responder. Thus, in the example shown, the data STS-S1' in the first segment is unique to ResponderA 120, whereas ResponderB 130, ResponderC 140, and ResponderD 150 each have common information which may be derived from a common key, data pair in this first segment, or, as will be discussed above, may be low-content data. Similarly, the data, STS-S2' in the second segment is unique to ResponderB 130, whereas ResponderA 120, ResponderC 140, and ResponderD 150, each have common information, derived from a common key, data pair, or low content data, in this second segment. And so on for STS-S3' and STS-S4', which are unique to ResponderC 140 and ResponderD 150 respectively. It will be appreciated that the number of segments limits the number of responder, and since the IEEE standard currently is limited to 4 segments, this is currently the maximum number of segments which can respond in the same time slot. However this could vary in case the standard, or common practice, changes. The sequence in which the Responders provide their unique STS response (STS-S1', STS-S2', etc.) is determined by the respective sequence-number of the responders: that is to say ResponderA above is first in sequence and has a sequence-number of 1; the second responder—ResponderB above—is second in sequence and thus has a sequence-number of 2, and so on. The sequence-number may thus be defined as the position in the sequence corresponding to that responder.

Whereas in known methods according to which the timeslots associated with each responder are predetermined by prior communication between the initiator and the set of responders, according to the present disclosure the STS segment associated with each responder, that is to say, the sequence number of that responder, is predetermined by prior communication between the initiator and the set of responders. Moreover, a ranging key (which is unique to an individual responder) is pre-agreed between the initiator and that responder (for instance by the above-mentioned prior communication, which may be in band or out of band). Furthermore, a bit-pattern for the synchronization bits for each responder is also predetermined, for instance in the same or another prior communication which, again without limitation, may be by means of UWB or out-of-band using another modality.

As already mentioned, according to the present disclosure, all the responders transmit their response signals in the same time slot. The skilled person will be aware that according to UWB protocols, the initiator and responders operate synchronous time clocks. Thus, at least in theory, the transmissions from the responders should thus be simultaneous. However, the skilled person will also be aware that the time clock synchronisation will include a margin of error such that the transmissions may not, in practice, commence exactly at the same moment, but will vary randomly between the responders. This is shown in exaggerated fashion by the misalignment of the transmissions within the timeslot shown in FIG. 3. Furthermore, the differences in distance between the responders and the initiator will mean that the responses will not be received at the initiator, exactly synchronously.

During the second time slot, the transponder receives a composite signal which includes the above-mentioned response signals from each the responders. As will be familiar to the skilled person, a correlator is used to determine the channel impulse response (CIR) from each of the responders and to identify the so called "first-path" information from each of the separate anchors. Once the responses have been separately identified and isolated, the initiator then only needs to decode a single STS segment from each responder.

It will be appreciated that a single correlator may be used by the initiator: since the initiator knows, for any given STS segment, which responder is of interest, it is able to switch to the appropriate ranging key during the preceding guard band time period. The generated STS sequence is then correlated against the received data during that STS segment, thereby comparing a generated STS sequence corresponding to the responder, to the actual received STS segment.

As mentioned, the ranging key, which may also be referred to as the secure key, and data for each segment to be decoded are unique to the responder which is associated with or allocated to that segment. Once the ranging key has been applied to decode the data for that specific segment in order to determine the timestamp from the associated responder, the distance between the initiator and that responder or anchor may be determined using known techniques, such as those defined in the IEEE 802.15.4z standard.

From the above discussion, it will be appreciated that the initiator requires STS segment information from any individual transponder responder during only one STS segment. As mentioned above, the remaining STS segments may be provided with blanking or low content information. In the embodiment above, the information transmitted by the responders other than that associated with that STS segments may be common across the transponders for example, information STS-S1, derived from a first common key and data pair in the first segment, STS-S2 derived from a second common key and data pair in the second segment, and so on. The common key and data pair may, typically, be the same for all segments, that is to say the first common key and data pair is the same as the second, third and fourth common key and data pair. In other embodiments they may be different, that is to say the first common key and data pair may be different from the second common key and data pair, et cetera.

In other embodiments, the remaining STS segments may be provided with "all zeros" or "all ones", or other low-content data.

As will be familiar to the skilled person, the ranging keys may typically use an AES block such that they are cryptographically secure.

According to the IEEE standard, time tracking may be performed across the packet during STS segments as well. The packet refers to the entire UWB frame and thus extends to the preamble and consists of the preamble, SFD, STS, physical layer header (PHR), and payload—or physical layer service data unit (PSDU). Since the STS segments now derived from separate responses, the switching between an STS segment received from one responder to the subsequent STS segment received from another responder will cause a disturbance in the monitored carrier frequency and timing tracking loop. In the case that the frequency offsets between the different responders is large, the correction loop may take longer to adjust and there is then an associated risk of ranging inaccuracies and data corruption. According to embodiments, this may be avoided by calibrating the frequency offsets of all of the responders to within, for example, +/−1 ppm (part per million). This may be achieved, for instance, by initially synchronising all the responder devices. Alternatively or in addition, the frequency drifts of individual responders may be periodically corrected to ensure synchronisation.

Figure 4:
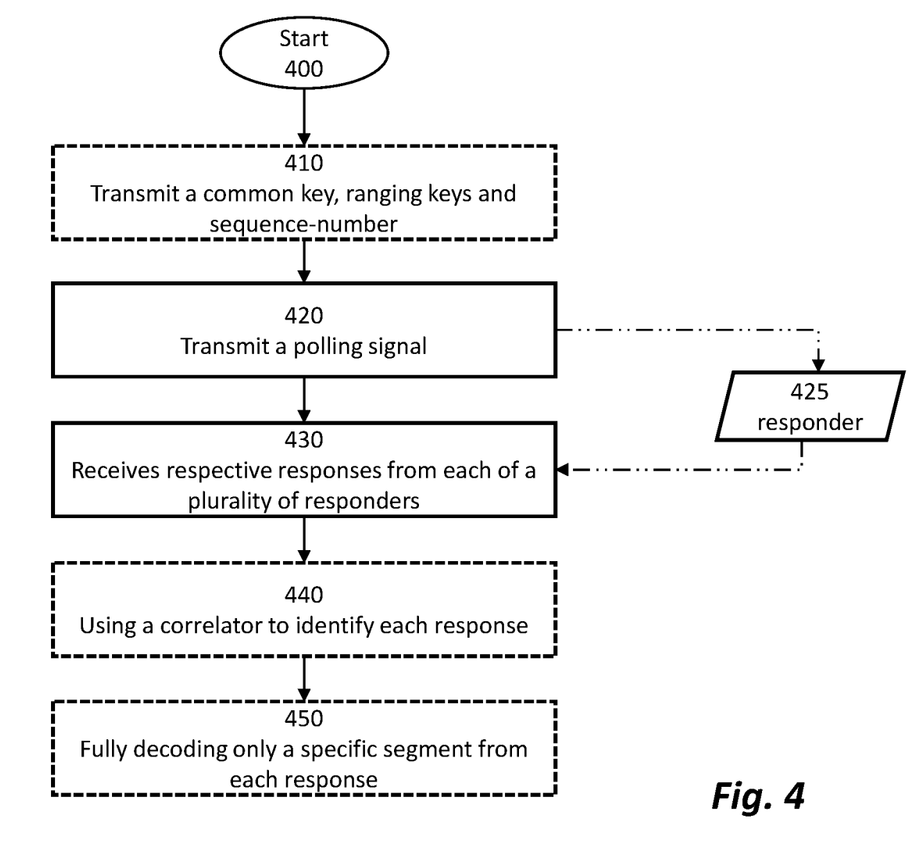
FIG. 4 shows a flow-chart of a method of operating an initiator device according to one or more embodiments.

FIG. 4 shows a flow diagram of a method of operating an initiator according to one or more embodiments. The method starts at step 400. At step 420 the initiator transmits a polling station signal to each of a plurality of responders 425. At step 430, the initiator receives respective responses from each of the plurality of responders. As discussed above, the received responses include ranging information in the form of data encrypted using a specific ranging key which is unique to the responder in a single one of four STS segments.

In one or more embodiments the method includes a further step 410 of transmitting a common key to all of the responders and ranging key and sequence number which are specific to the individual responders. The common key may be agreed by "out-of-band" communication, that is to say by using another communication mode such as BLE or WIFI, prior to the ranging communications, or, alternatively and without limitation, may be derived at the initiator and each of the responders, separately.

In one or more embodiments, the method includes using a correlator to identify each response, in a further step 440. Furthermore, in one or more embodiments the method includes the further step 450 of fully decoding only a specific segment from each response.

Figure 5:
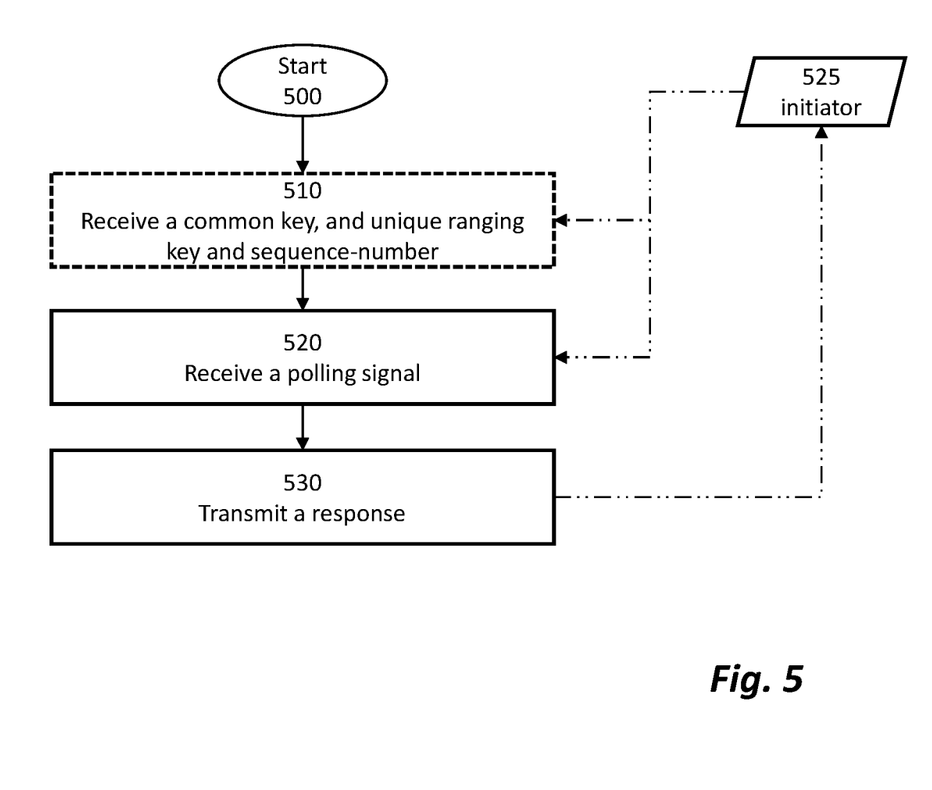
FIG. 5 shows a flowchart of a method operating a responder device according to one or more embodiments.

FIG. 5 shows a flow diagram of a method of operating a responder according to one or more embodiments. The method starts at step 500. At step 520, the responder receives a polling signal from an initiator, shown schematically at 525. At step 530 the responder transmits a response. The response includes ranging information in the form of data encrypted using a specific ranging key which is unique to the responder in a single one of four STS segments. In one or more embodiments, the method includes an additional step 510 of receiving a common key, together with a ranging key and sequence number which are specific or unique to the responder.

From reading the present disclosure, other variations and modifications will be apparent to the skilled person. Such variations and modifications may involve equivalent and other features which are already known in the art of ranging by UWB, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. An Ultra Wide Band (UWB) ranging method comprising a ranging communication with a plurality of responder devices, the ranging communication comprising:
   transmitting, by an initiator device, a polling signal in a time slot;
   receiving a respective response from each of the plurality of responder devices,
   overlapping and in a next time slot, each response comprising:
      a preamble comprising synchronization bits,
      a start of frame delimiter (SFD),
      and a scrambled time-stamp sequence (STS);
      wherein the STS comprises a sequence of segments each preceded by a respective guard interval,
         wherein a specific segment of the sequence of segments comprises data derived from a ranging key and a responder-identifier unique to each responder of the plurality of responder devices,
         wherein a sequence-number of the specific segment is unique to the respective response, and
         wherein a remainder of the sequence of segments each comprise identical data.

2. A method as claimed in claim 1, wherein the remainder of the sequence of segments each comprise the same data derived from a predetermined common key and predetermined common data.

3. A method as claimed in claim 1, wherein the remainder of the sequence of segments each comprise the same data corresponding to all ones or all zeros.

4. A method as claimed in claim 1, wherein the ranging communication complies with a Ultra Wide Band, UWB, communication protocol for authenticated secure ranging.

5. A method as claimed in claim 1, further comprising, prior to transmitting the polling signal, transmitting to each responder a respective ranging key and sequence-number, and at least one of a common key and common data.

6. A method as claimed in claim 5, wherein transmitting the common key, and the respective ranging key and sequence-number to each responder is by means of a communication protocol which is different from UWB communication protocol.

7. A method as claimed in claim 1, further comprising:
using the synchronisation bits in a correlator to identify each response,
and, for each response, fully decoding only the specific segment corresponding to its sequence-number.

8. A method of operating a responder device among a plurality of responder devices to facilitate Ultra Wide Band (UWB) ranging and comprising a ranging communication with an initiator device, the ranging communication comprising:
receiving, by a responder device of the plurality of responder devices, a polling signal in a time slot;
transmitting a response in a next time slot, the response comprising:
a preamble comprising synchronization bits,
a start of frame delimiter (SFD),
and a scrambled time-stamp sequence (STS);
wherein the STS comprises a sequence of segments each preceded by a respective guard interval,
wherein a specific segment of the sequence of segments comprises data derived from a ranging key and responder-identifier unique to the responder among the plurality of responders,
wherein a sequence-number of the specific segment is unique to the response, and
wherein a remainder of the sequence of segments each comprise identical data.

9. A method as claimed in claim 8, wherein the remainder of the sequence of segments each comprise the same data derived from a predetermined common key and predetermined common data.

10. A method as claimed in claim 8, wherein the remainder of the sequence of segments each comprise the same data corresponding to all ones or all zeros.

11. A method as claimed in claim 8, wherein the ranging communication complies with a UWB communication protocol for authenticated ranging.

12. A method as claimed in claim 8, further comprising, prior to transmitting the polling signal, receiving at least one of a common key and common data, the ranging key and the sequence-number.

13. A method as claimed in claim 12, wherein the common key, the common data, the respective ranging key and sequence-number is received by means of a communication protocol different to UWB communication protocol.

14. An initiator device configured to perform ranging with a plurality of responder devices, and comprising:
a transmitter configured to transmit a polling signal in a time slot;
a receiver configured to receive a respective response from each of the plurality of responder devices, overlapping and in a next time slot, each response comprising:
a preamble comprising synchronization bits,
a start of frame delimiter (SFD),
and a scrambled time-stamp sequence (STS);
wherein the STS comprises a sequence of segments each preceded by a respective guard interval,
wherein a specific segment of the sequence of segments comprises data derived from a ranging key and responder-identifier unique to a responder among the plurality of responders,
wherein a sequence-number of the specific segment is unique to the response, and
wherein a remainder of the sequence of segments each comprise identical data.

15. The initiator device as claimed in claim 14, wherein the remainder of the sequence of segments each comprise the same data derived from a predetermined common key and predetermined common data.

16. The initiator device as claimed in claim 14, wherein the remainder of the sequence of segments each comprise the same data corresponding to all ones or all zeros.

17. The initiator device as claimed in claim 14, further comprising:
a correlator, configured to use the synchronisation bits in a correlator to identify each response.

18. The initiator device as claimed in claim 14, further comprising:
a decoder, configured to, for each response, fully decode only the specific segment of the sequence of segments corresponding to its sequence-number.

19. The initiator device as claimed in claim 17, further comprising:
a decoder, configured to, for each response, fully decode only the specific segment of the sequence of segments corresponding to its sequence-number.

* * * * *